(12) United States Patent
Glass et al.

(10) Patent No.: US 8,036,595 B2
(45) Date of Patent: Oct. 11, 2011

(54) CAPACITIVE BONDING OF DEVICES

(75) Inventors: Andrew C. Glass, Woodinville, WA (US); Christopher M. Dreher, Bothell, WA (US); Ellick H. Sung, Seattle, WA (US); Randall E. Aull, Kenmore, WA (US); Doron J. Holan, Seattle, WA (US); Craig S. Ranta, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1524 days.

(21) Appl. No.: 11/423,235

(22) Filed: Jun. 9, 2006

(65) Prior Publication Data

US 2006/0217064 A1 Sep. 28, 2006

Related U.S. Application Data

(62) Division of application No. 10/453,066, filed on Jun. 3, 2003.

(51) Int. Cl.
*H04B 5/00* (2006.01)
(52) U.S. Cl. ........... 455/41.1; 455/40; 455/95; 455/100; 340/5.64; 340/825.72; 340/565; 713/186
(58) Field of Classification Search .................. 455/41.1, 455/100, 95, 40; 340/5.64, 825.72, 565, 340/5.74; 713/186
See application file for complete search history.

(56) References Cited

U.S. PATENT DOCUMENTS

| | | |
|---|---|---|
| 4,161,766 A | 7/1979 | Castleberry et al. |
| 5,265,252 A | 11/1993 | Rawson, III et al. |
| 5,339,432 A | 8/1994 | Crick et al. |
| 5,613,123 A | 3/1997 | Tsang et al. |
| 5,727,212 A | 3/1998 | Dinallo |
| 5,796,827 A | 8/1998 | Coppersmith et al. |
| 5,811,897 A * | 9/1998 | Spaude et al. ................ 307/149 |
| 5,923,757 A | 7/1999 | Hocker et al. |
| 5,999,996 A | 12/1999 | Dunn |
| 6,009,247 A | 12/1999 | Canora et al. |

(Continued)

FOREIGN PATENT DOCUMENTS

| | | |
|---|---|---|
| EP | 869651 A | 10/1998 |
| EP | 123337 A | 8/2002 |
| JP | 02002271274 A | 9/2002 |

OTHER PUBLICATIONS

"Biolanalogics Technology Resources"; downloaded from: http://www.bioanalogics.com/technology.htm on Jun. 19, 2003, 2 pages.

(Continued)

*Primary Examiner* — Tuan Pham

(57) ABSTRACT

The present invention relates to systems and methods that facilitate wireless device communications and configuration. A detection component identifies N devices that are coupled together via a biological medium, N being an integer, wherein the medium includes direct or indirect touching to a device or devices. After biological contact, a configuration component initiates a configuration between a subset of the devices. Although configurations and/or other communications can be conducted through a medium such as the human body, the present invention can employ an initial touch to identify respective devices whereby other electronic configuration sequences commence without further device contact. Other aspects include chain touching between users and/or devices to facilitate contact between the devices. Location detection components can also be provided to identify when users are present near a device, the detected presence to commence further automated procedures, and/or the location detection components can enable devices to identify other devices in a crowded wireless environment.

20 Claims, 11 Drawing Sheets

U.S. PATENT DOCUMENTS

| | | | |
|---|---|---|---|
| 6,104,913 | A | 8/2000 | McAllister |
| 6,118,882 | A | 9/2000 | Haynes |
| 6,211,799 | B1 | 4/2001 | Post et al. |
| 6,223,018 | B1 | 4/2001 | Fukumoto et al. |
| 6,378,005 | B1 | 4/2002 | Hyder et al. |
| 6,437,772 | B1 | 8/2002 | Zimmerman et al. |
| 6,460,094 | B1 | 10/2002 | Hanson et al. |
| 6,567,915 | B1 | 5/2003 | Guthery |
| 6,609,199 | B1 | 8/2003 | DeTreville |
| 6,643,774 | B1 | 11/2003 | McGarvey |
| 6,721,555 | B1 | 4/2004 | Phillips et al. |
| 6,754,472 | B1 | 6/2004 | Williams et al. |
| 6,778,226 | B1 | 8/2004 | Eshelman et al. |
| 6,795,688 | B1 | 9/2004 | Plasson et al. |
| 6,815,657 | B2 * | 11/2004 | Toyoshima et al. ....... 250/214 R |
| 6,864,780 | B2 | 3/2005 | Doi et al. |
| 7,174,130 | B2 | 2/2007 | Kurisko et al. |
| 7,202,773 | B1 * | 4/2007 | Oba et al. ................. 340/5.8 |
| 2002/0023215 | A1 | 2/2002 | Wang et al. |
| 2003/0014186 | A1 | 1/2003 | Adams, Jr. et al. |
| 2003/0078072 | A1 | 4/2003 | Serceki et al. |
| 2003/0172271 | A1 | 9/2003 | Silvester |
| 2004/0122649 | A1 | 6/2004 | Bartek et al. |
| 2005/0066044 | A1 | 3/2005 | Chaskar et al. |
| 2005/0111420 | A1 | 5/2005 | Fujii |
| 2005/0120096 | A1 | 6/2005 | Rekimoto et al. |
| 2006/0022048 | A1 | 2/2006 | Johnson |

OTHER PUBLICATIONS

"Bio|analogics Technology—Body Composition Techniques"; downloaded from: http://www.bioanalogics.com/techniques.htm on Jun. 19, 2003, 7 pages.

"Wireless connections made easy"; Specification of the Bluetooth System, Specification vol. 1, Core, v. 1.1, Feb. 22, 2001, pp. 1-32; and Revision History, Feb. 22, 2001, pp. 896-897.

"Personal Area Networks: Near-field intrabody communication"; IBM Systems Journal, vol. 35, No. 3&4, 1996—MIT Media Lab, 11 pages.

Martin Lutz, "The Determination of the Immunity to Electrostatic Discharge "ESD" With Transient 1000 Generator", Seminar 1999, EMC Partner.

ISO/IEC 8802-11. "IEEE Standard for Information Technology—Telecommunications and Information Exchange Between Systems—Local and Metropolitan Area Networks—Specific Requirement Part 11: Wireless LAN Medium Access Control (MAC) and Physical Layer (PHY) Specification" 1999. pp. 1, 34-58.

Mark D. Corner et al. Zero-interaction Authentication, Proceedings of the 8th Annual International Conference on Mobile Computing and Networking. Sep. 23-28, 2002, pp. 1-11, Atlanta, Georgia.

Refik Molva et al., Authentication Method with Impersonal Token Cards, IEEE Computer Society Symposium on Research in Security and Privacy, 1993, pp. 1-10.

Vipin Samar, Unified Login with Pluggable Authentication Modules (PAM), Proceedings of the 3rd ACM Conference on Computer and Communications Security, 1996, pp. 1-10, New Delhi, India.

Office Action dated Aug. 25, 2008 for U.S. Appl. No. 11/159,605, 18 pages.

European Search Report dated Jun. 7, 2006, mailed Jul. 7, 2006 for European Patent Application No. 05112925, 9 pages.

* cited by examiner

CAPACITIVE BONDING OF DEVICES

CROSS-REFERENCE TO RELATED APPLICATIONS

This application is a divisional of U.S. patent application Ser. No. 10/453,066, filed Jun. 3, 2003, entitled "CAPACITIVE BONDING OF DEVICES", which is incorporated herein by reference.

TECHNICAL FIELD

The present invention relates generally to systems and methods that facilitate communications between devices, systems, processes, and/or individuals. More particularly, the present invention relates to configuration of wireless systems in accordance with a biological medium such as via a human touch.

BACKGROUND OF THE INVENTION

Wireless and other electronic devices such as laptop and handheld computers are commonplace today. Other devices commonly employed in today's high-technology arena include compact disc players, communications devices, (e.g., pagers and cell phones), and personal data assistants (PDAs) to name but a few examples. As electronics manufacturing techniques have improved, weight and power consumption requirements of many of these devices have decreased. At the same time, the capabilities and complexities of various devices have similarly increased, however. Consequently, with the vast array of network devices at one's disposal, it is often times desirable to have one or more of these devices communicate and/or exchange data with one or more other devices. Given complexities such as differing interface and configuration requirements, having devices communicate with one another can be time-consuming and challenging for even the most technologically astute user.

In just one example of configuration complexity, desktop computers typically interface with a plurality of different devices. Most computers provide interface access though different coupling systems such as serial ports, parallel ports, USB ports, Ethernet ports, and wireless ports such as via an infrared technology. With respect to wireless technology, many computers routinely employ a wireless mouse and/or a wireless keyboard, for example. If a wireless keyboard were to be adapted to an existing computer, then before the keyboard becomes operable, a set-up procedure typically takes place. This may involve entering codes into the computer as part of a keyboard configuration installation routine (e.g., control panel codes to enable keyboard and uninstall redundant software). More than likely, before proper installation can commence, a floppy disk or CD is loaded to facilitate a guided or automatic software/hardware configuration. In most cases, this is achieved within minutes. However, as can be appreciated, if a large number of devices needed to be installed—such as in a modern Software Engineering department, and respective devices had many wireless and/or other components associated therewith, then the task of creating a functional system can be quite daunting.

In some cases, networks have alleviated a portion of the burden associated with installing a large computer system. This usually involves downloading a software configuration package to respective computers already established on a network. When wireless technology is involved, however, there may not be a preexisting network established in which to perform the download. Thus, more laborious procedures such as previously noted with respect to guided configuration packages are manually applied to establish a network connection or configuration. Typically, these packages are employed to initially establish the wireless network connection before a subsequent configuration download occurs.

As many are familiar when installing a device, a compact disk (CD) or other media is generally loaded on a computer followed by execution of a set-up routine. The routine generally involves an automated sequence whereby a user is asked a series of questions pertinent to the installation at hand. The final sequence of the installation is typically followed by a "Finish" sequence wherein the computer is instructed to complete a configuration in accordance with the user's previous selections or answers to automated questions. If dozens of devices were to be configured in a nonexistent network, however, and if the ultimate network interconnection configuration was previously unknown, then the task of creating the network via loading/configuring many devices would clearly be time-consuming at the least.

The above loading procedures can also be problematic when networks have to be rearranged based upon unforeseen conditions. For example, in a large office environment, it may be decided before hand that three wireless networks are to be initially configured or installed, wherein respective networks are associated with many network devices. Upon physical installation of the system, it may turn out that more or less than three network configurations are optimally suited for the installation. In this case, the above noted procedures may have to be reinitiated in order to reconfigure the network. Similar problems can also occur as situations change such as when expanding or downsizing a network based upon ever changing business needs.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to systems and methods that facilitate device configurations and communications in a wireless network environment. In one aspect of the present invention, a biological medium such as the human body is employed as a capacitor (or other impedance/physical characteristic) to pair wireless devices by having a user (or users) touch the devices in a concurrent manner. Touching the devices concurrently facilitates a nominal flow of electricity between the devices in order that subsystems within the devices can be activated. For example, configuration and security procedures can be initiated while mitigating interference with other wireless devices that may reside nearby, and preserving the security of the configuration information. Thus, in one example, wireless devices can identify each other in a rapid manner via a simple touch and also discriminate from unrelated devices in a crowded network environment (e.g., pairing a wireless keyboard, a computer by momentarily touching each device and the computer).

In one example of the present invention, peripherals such as phones, mice, headsets and so forth can be easily and quickly adapted to respective wireless devices such as computers, personal digital assistants, cell phones and/or other electronic/wireless devices. These devices may employ a specific contact point for touching and/or provide other contact mediums such as utilizing the case of the device. When these points are engaged by the user (or users), components in the devices can initiate configuration routines through the human body as a conduit and/or merely employ the human body as an initial identifier between devices, whereby the respective devices complete the configuration after the initial identifying sequence.

It is to be appreciated the present invention is not limited to device-to-device configurations through the human body. For example, a single user may touch or approach multiple devices in a concurrent manner to achieve wireless compatibility between devices. In another case, multiple users may chain themselves (e.g., more than one user holding/touching hands between two or more devices) in order to bridge a gap between devices, wherein the chain is then employed as the conducting medium for communications.

In yet another case, when current begins to flow after touching, electrical pulses or data packets may be generated to facilitate unique identification between devices. Still other aspects include identifying or characterizing users according to an impedance profile (e.g., touching a sensor and recording/storing the impedance profile of the user). The impedance profile can then be employed in such automated procedures as user identification, security procedures, pairing procedures, and/or providing device address information upon touch.

Although direct or indirect physical touching may be employed with the present invention to activate/identify respective devices, other techniques may also be employed. For example, a location detector (e.g., piezoelectric material/accelerometer that senses touch or movement) may be utilized to detect a user's presence within proximity of respective devices to be operatively coupled, wherein configuration or other communications sequences can then be initiated upon detection of the user's proximity to the devices. Location detection can also be applied to determine respective device locations, wherein after being activated by the user's touch, the activated devices then identify their locations in order to further communicate and discriminate from other wireless devices.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION OF THE INVENTION

The present invention relates to systems and methods that facilitate wireless device communications and configuration. A detection component identifies N devices that are coupled together via a biological medium, N being an integer, wherein the medium includes direct or indirect touching to a device or devices. After biological contact, a configuration component initiates a configuration between a subset of the devices. Although configurations and/or other communications can be conducted through a medium such as the human body (e.g., network addresses established between devices through body during contact), the present invention can employ an initial touch to identify respective devices whereby other electronic configuration sequences commence without further device contact. Other aspects include chain touching between users and/or devices to facilitate contact between the devices (e.g., multiple users touching each other to make contact with respective devices). Location detection components can also be provided to identify when users are present near a device, the detected presence to commence further automated procedures, and/or the location detection components can enable devices to identify other devices in a crowded wireless environment.

As used in this application, the terms "component," "service," "profile," and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "inference" refers generally to the process of reasoning about or inferring states of the system, environment, and/or user from a set of observations as captured via events and/or data. Inference can be employed to identify a specific context, location, identity, or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 1:
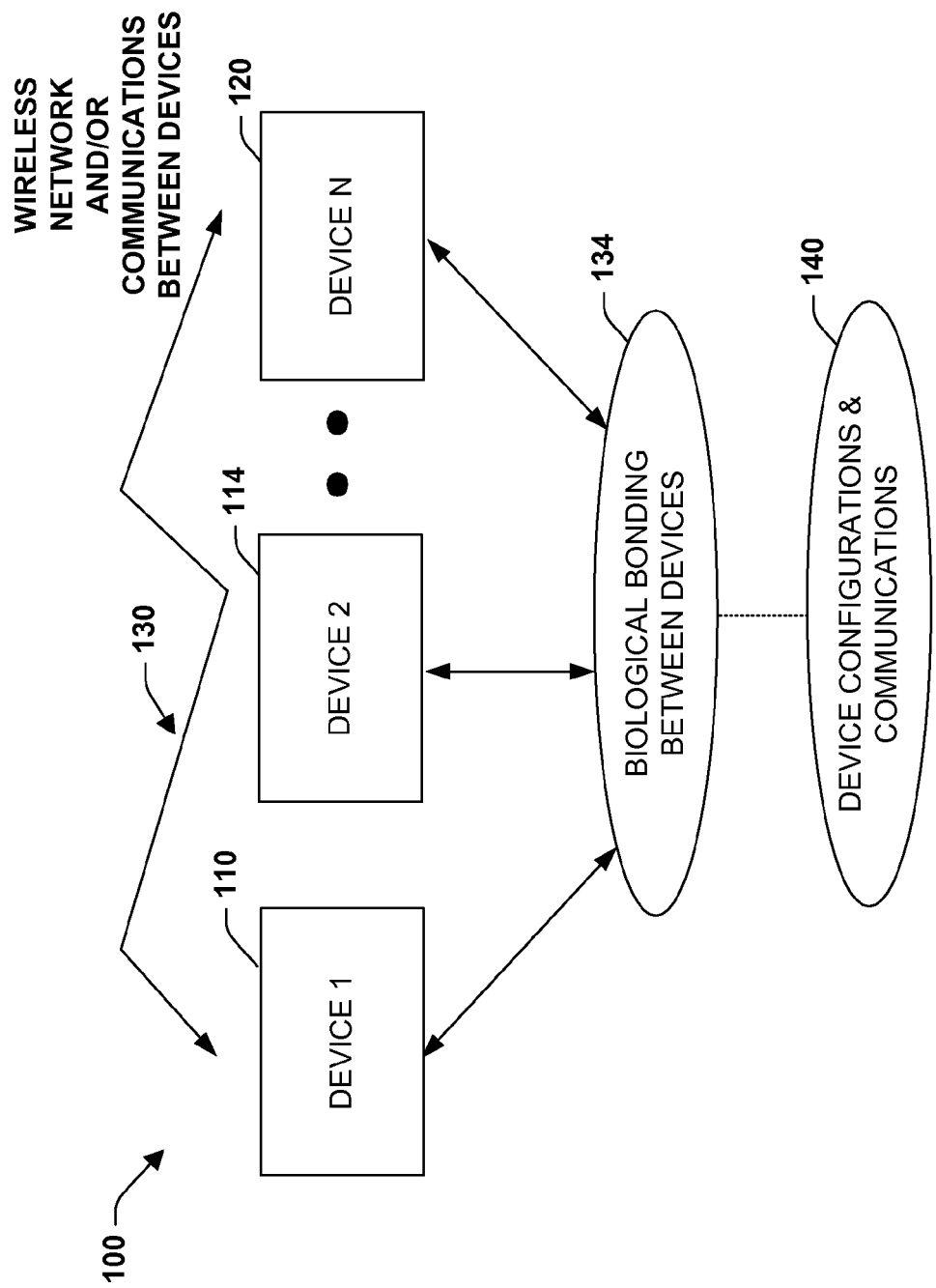
FIG. 1 is a schematic block diagram illustrating biological bonding and device communications in accordance with an aspect of the present invention.

Referring initially to FIG. 1 a system 100 illustrates biological bonding and device communications in accordance with an aspect of the present invention. The system 100 employs one or more devices 110-120 that can be adapted to communicate across a wireless network 130 (e.g., infrared, electromagnetic, broadband, and employing such standards as Bluetooth, Wireless Application Protocols, IR/DA, 802.11, Ultra Wideband technology, and so forth). The devices 110-120 can include substantially any type of electronic device capable of communicating across the wireless network 130 (e.g., computers, laptops, phones, pagers, personal digital assistants (PDA), keyboard, mouse, headphones, and so forth). In order to establish a network connection or facilitate further communications, a biological bonding 134 occurs between at least one of the devices 110-120 and at least one other device. After bonding, one or more device configurations and/or other communications can occur at 140.

In general, the biological bonding 134 employs a human touch or contact between devices that enable capacitive coupling between the devices, wherein signals are transmitted across the capacitive coupling to establish communications between devices. It is to be appreciated, however, that substantially any biologically initiated contact—direct or indirect, can cause coupling in accordance with the present invention. This can include impedance characteristics other than capacitance (e.g., human body resistance or inductance). For example, a user may have conductive gloves or clothing that facilitates coupling between the user and the device. In another example, location detection components can be provided that merely sense a device or user's presence and the identified location is utilized to trigger further communications. These and other coupling/detection aspects are described in more detail below.

Typically, the biological bonding 134 includes contact by the human body which is employed as a capacitor (or other impedance/physical characteristic) to operatively couple the wireless devices 110-120 to other wireless devices by having a user (or users) touch the devices in a concurrent manner. Touching the devices facilitates a nominal flow of electricity or current between the devices in order that subsystems within the devices can be activated, the subsystems being described in more detail below. Upon activation, device configurations and communications 140 can be initiated while mitigating interference with other wireless devices that may reside nearby.

As will be described in more detail below, the device configurations and communications 140 can include automated procedures to establish the devices 110-120 on the wireless network 130 (e.g., automated download of code to pair mouse and computer via wireless connection). The automated procedures can occur directly through the biological bonding 134 and/or can occur after an initial bonding sequence (or detection sequence) to activate/identify the respective devices 110-120 followed thereafter by further automated procedures or communications. Also, it is to be appreciated that power and/or other information may be transmitted between the devices 110-120 and by using the body as a conductive medium. Communicated signals may include analog as well as digital signals (e.g., electrical currents, pulses, waveforms, files, and so forth).

Figure 2:
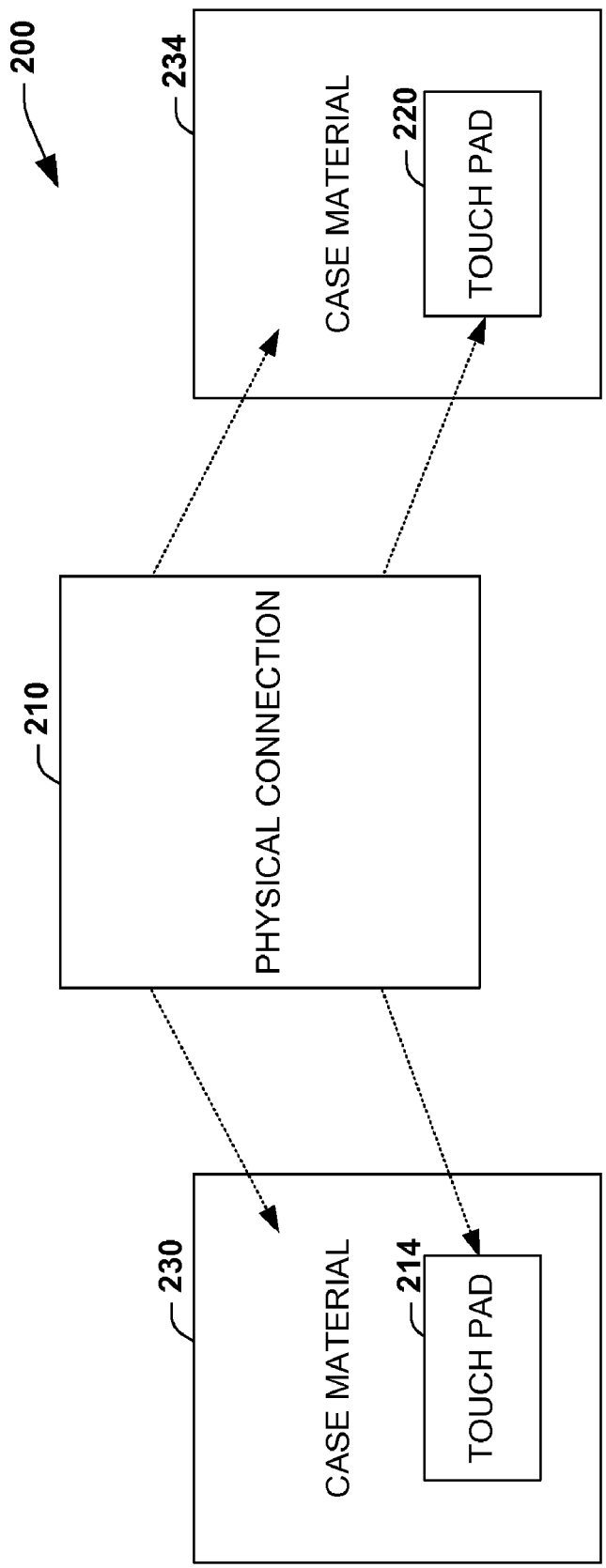
FIG. 2 is a diagram illustrating a physical connection between devices in accordance with an aspect of the present invention.

Referring to FIG. 2, a system 200 illustrates a physical coupling between devices in accordance with an aspect of the present invention. In this aspect, a physical connection 210 such as a direct or indirect human touch is applied to a designated area such as a touch pad 214, 220 and/or applied to another area of a device such as case material 230, 234. When the physical connection 210 is achieved, electrical current begins to flow which can then be sensed by the respective devices (e.g., impedance detector, or other sensor) to initiate further automated procedures such as establishing wireless network connections or transmitting configuration information between devices, for example.

The touch pads 214, 220 can be located or associated with substantially any area on a device accessible to a user or users. These can include conductive or semi-conductive media capable of facilitating current flow between devices and through the human body. For example, such materials include copper, gold, silver, conductive plastics, metal, and so forth. The case material 230, 234 is generally associated with the housing of the device and can include similar materials as the touch pads 214 and 234. This can include conductive coatings, laminates, plastics having conductive properties, and/or other materials that facilitate establishing an electrical circuit in accordance with biological contact with a wireless device. In some cases, touch pads 214, 220 may be provided in addition to having respective case materials 230, 234 that are also adapted to facilitate electrical activity. As can be appreciated, the touch pads 214, 220 and case materials 230, 234 can include various sizes, shapes, dimensions (e.g., cubic structure), textures, colors or other appearances (e.g., text indicating touch pad area).

Figure 3:
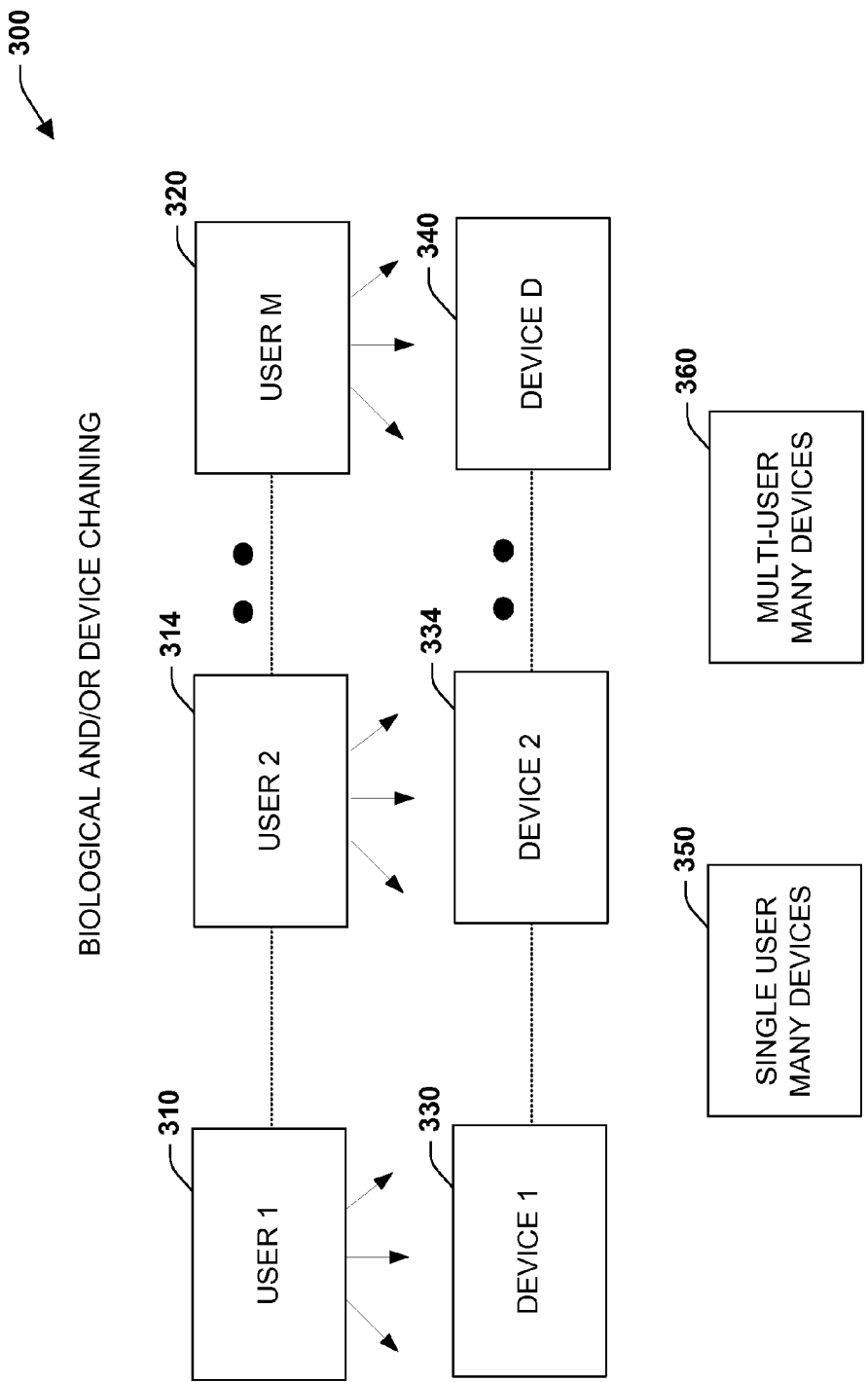
FIG. 3 is a diagram illustrating chain configurations in accordance with an aspect of the present invention.

Turning to FIG. 3, a system 300 illustrates chain configurations in accordance with an aspect of the present invention. In this aspect, various combinations of users and/or wireless devices may be employed in accordance with the biological bonding previously described. In one example, users 310-320 may apply contact indirectly through other users to one or more devices 330-340. For example, a first user at 310 may touch the device at 330 and couple to the device 340 though a second user 314 and third user at 320. The biological chain formed by users is then employed to establish communications between the devices 330 and 340.

As can be appreciated, various chaining configurations are possible. These chains can be employed to span distances and/or configure suitable or irregular network configurations. For example, the second user 314 may touch one or more other devices 330-340 while still completing the chain between the first device 330 and the third device 340. Thus, at reference 350, for example, a single user may establish connections between many devices (e.g., touch two devices with left foot and left hand, touch one device with left elbow, touch one device with right hand, and final device with right foot, in a concurrent manner). At reference 360, multiple users may be chained to establish communications between two devices and/or establish connections with many other devices by respectively touching a device, user, and/or combination thereof. Alternatively, devices themselves may be employed to complete or facilitate chaining by stacking and/or placing the devices in contact with one another (e.g., putting devices having conductive cases side-by-side to form a portion of chain).

Figure 4:
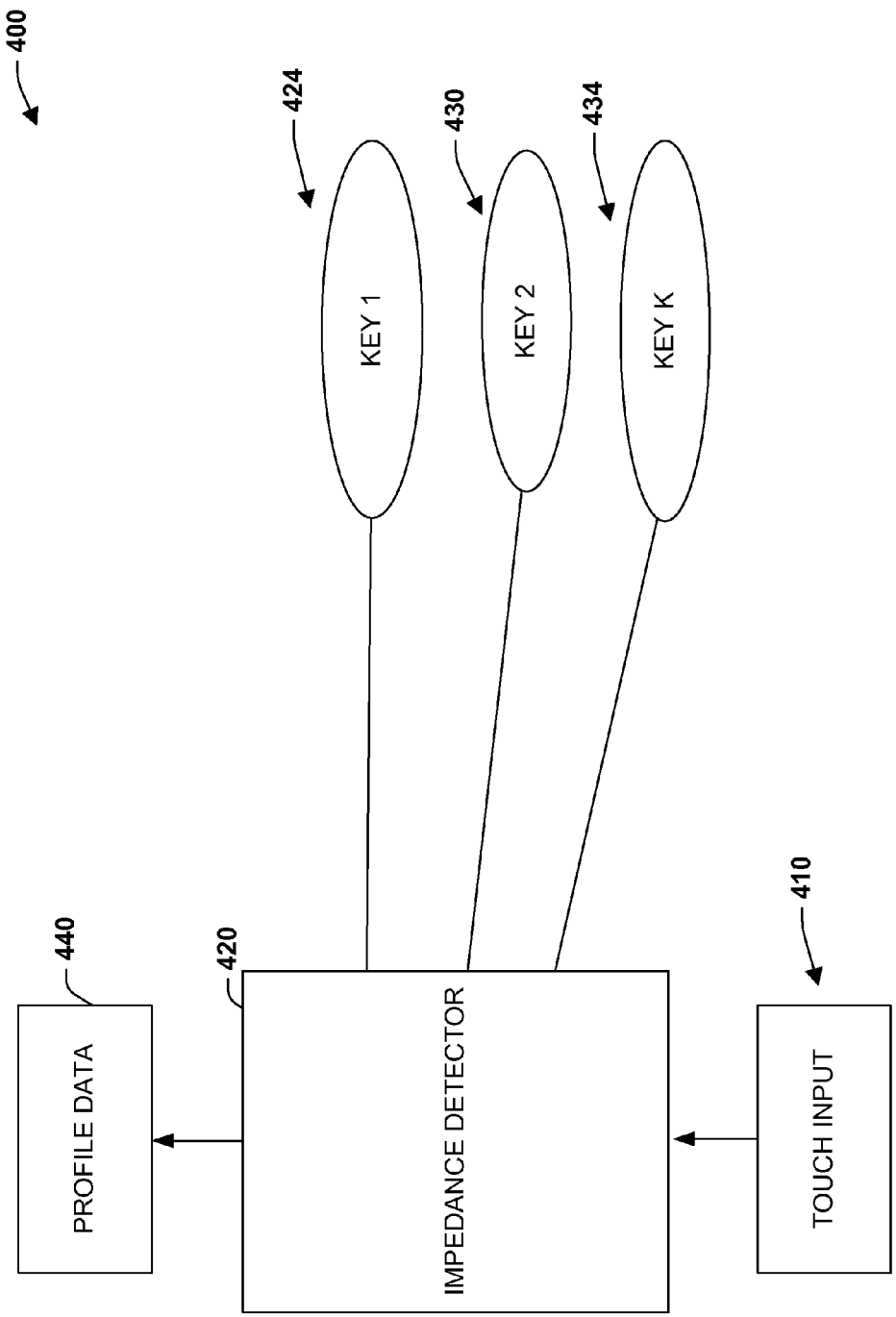
FIG. 4 is a schematic diagram illustrating biological identification in accordance with an aspect of the present invention.

Referring to FIG. 4, a system 400 illustrates biological identification in accordance with an aspect of the present invention. In this aspect, a touch input 410 or sensor is analyzed by an impedance detector 420 to generate one or more keys 424-434 (e.g., key 1 is associated with measurement 1, key 2 is associated with measurement 2 and so forth). The impedance detector 420 analyzes such aspects as capacitance, inductance, and resistance to determine a biological profile for a respective user employing the touch input 410. For example, such detector 420 may measure capacitance directly (e.g., capacitance meter) and/or indirectly such as placing a human impedance measurement received from the touch input 410 into a resonant circuit and measuring a resultant frequency or phase shift. As can be appreciated, various analytical techniques can be employed to determine impedance or other electrical characteristics.

After an impedance measurement has been taken, the key data 424-434 is stored as user profile data 440. For example, a first user may generate a measurement key associated with 187.82 picofarads and a second key of 327 ohms at 250 megahertz. The respective keys 424-434 are then stored as a file in the profile data 440 and tagged as being related to the first user. A second user and so forth may be similarly characterized and logged in the profile data 440. As will be described in more detail below, the profile data 440 can then be employed to launch one or more other automated applications in accordance with the present invention. It is to be appreciated that absolute identity of a user may not always be necessary. For example, a home adult user may employ a personal impedance profile to prevent or limit access of children to a home desktop computer (e.g., all impedances above or below a predetermined threshold are denied or permitted access to the computer).

Figure 5:
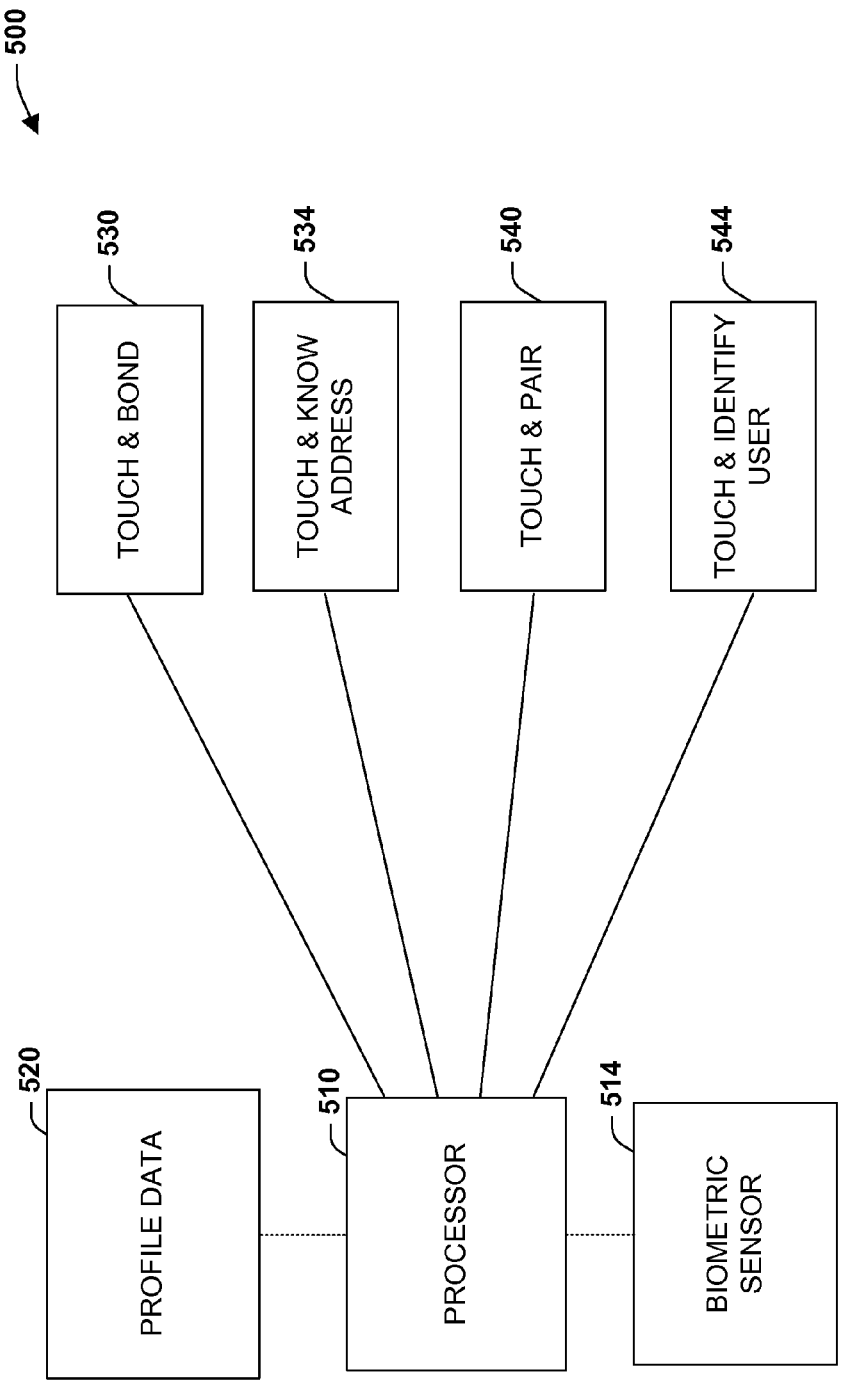
FIG. 5 is a system diagram illustrating example applications in accordance with an aspect of the present invention.

FIG. 5 is a system 500 illustrating example applications in accordance with an aspect of the present invention. In this aspect, a processor or computer receives user input (e.g., touch input) from a biometric sensor 514, wherein the processor identifies or characterizes the user as previously described above (e.g., generate one or more identification keys). The processor 510 may be associated with a profile data store 520 that contains past recorded files identifying one or more users and respective characteristics. If the input from the biometric sensor 514 matches or is within a predetermined threshold of a previously stored profile, then one or more automated applications can be enabled. In one case, a touch and bond application can be initiated at 530 by the processor 510. For example, if a profile match occurs, an automatic login procedure can be initiated that facilitates user access to the processor 510 and associated databases (not shown). In another example, custom screens or other applications can be launched that are associated with the user. At 534, a touch at the biometric sensor 514 may cause a wireless device to automatically know a network address (e.g., if user 1 is identified, then associate wireless device with network address 0030). This can also include automatically providing a device's network address to the user (e.g., upon touch of biometric sensor, display device network address).

At 540, a touch and pair application can be performed. This can include concurrent touching between devices as described above, and/or can include touching one device, and then at some time later, touching one or more other devices, wherein the devices would employ the profile data 520 to identify each other for a respective network configuration (e.g., one device broadcasting with a code derived from key data in the profile data store and only those other devices that have also been touched by the same user responding to the broadcast). At 544, a touch and identify sequence may be initiated. This can include applying one or more security procedures to enable or disable access to the processor 510. For example, before a user can access a particular application or system, the user must first be identified via the biometric sensor 514 and have a corresponding profile in the profile data store 520. Identification of the user can include employing the profile data as part of machine authentication and/or authorization procedures that limit access to authorized/verified users and/or machines.

Figure 6:
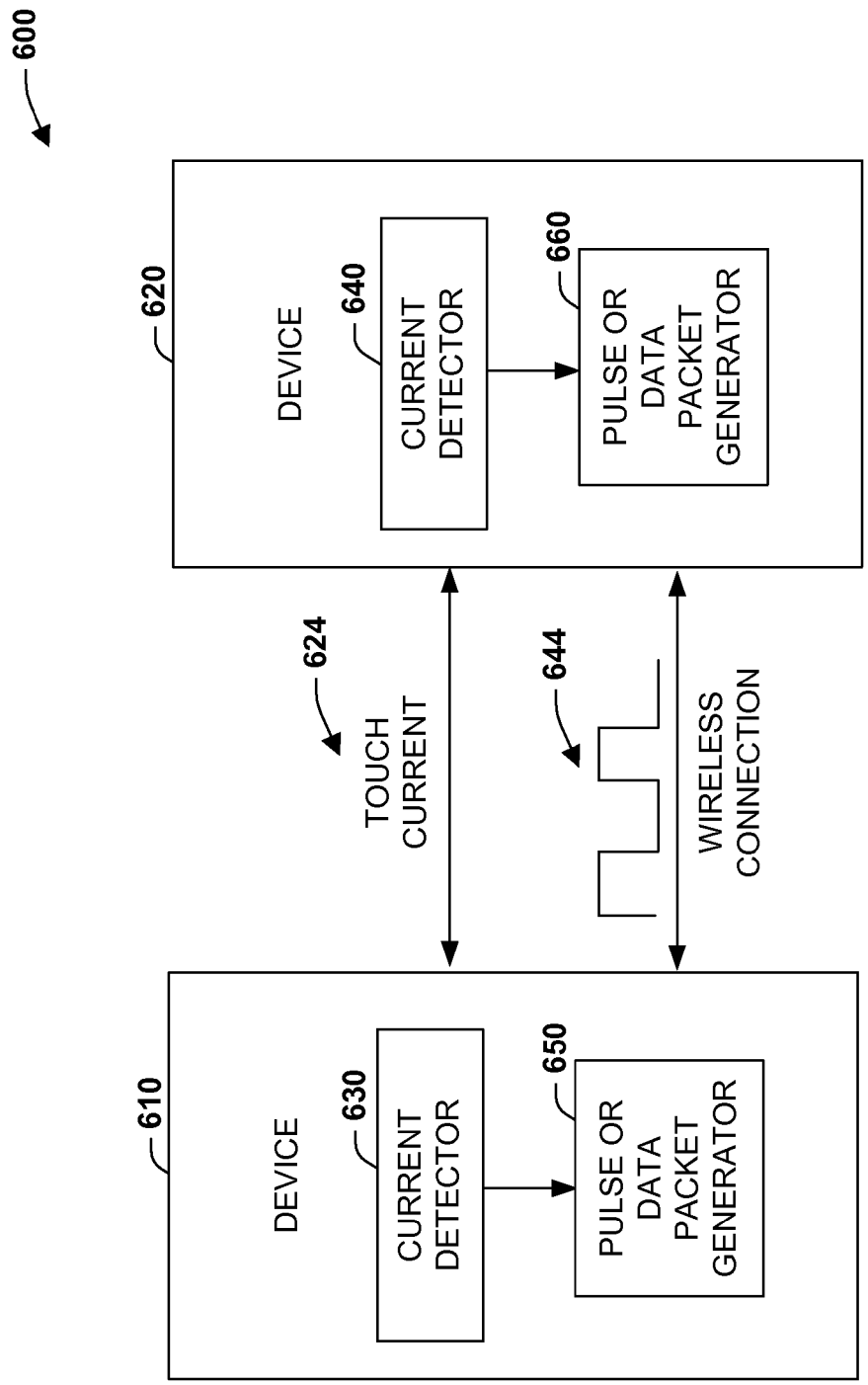
FIG. 6 is a diagram illustrating signal generation in accordance with an aspect of the present invention.

FIG. 6 is a system 600 illustrating signal generation in accordance with an aspect of the present invention. A device 610 and device 620 are touched as previously described, wherein an electrical current 624 flows between devices. When devices are capacitively coupled, a current or voltage source (not shown) can transmit current though the circuit completed by the user or users. As the current 624 flows, a current detector 630 and 640 measures the current (e.g., transistor/diode detector, voltage divider, amplifier, measure current supplied by current or voltage source). From the measured current, a data packet or pulse 644 can be generated over a wireless connection (or modulated on the touch current 624) from pulse generators 650 and/or 660. The data packet or packets 644 are then employed to allow the devices 610 and/or 620 to identify themselves. For example, if the touch current 624 measures 53 micro amps, then a corresponding data packet can be generated that is proportional or some derivative of the measured current (e.g., for every 10 micro amps measured, generate 10 pulses). Since each device has measured or generated approximately the same current, then these respective devices would then be able to identify pulses that were also derived from the measured current. For example, the devices 610 and 620 could send an initial identifying sequence derived from the touch current 624 (e.g., will only correspond with devices that identify themselves within a predetermined threshold of pulses), the identifying sequence could then be followed by a configuration or other communication sequence. Other devices having not been touched would thus be discriminated from the communications between devices 610 and 620.

Figure 7:
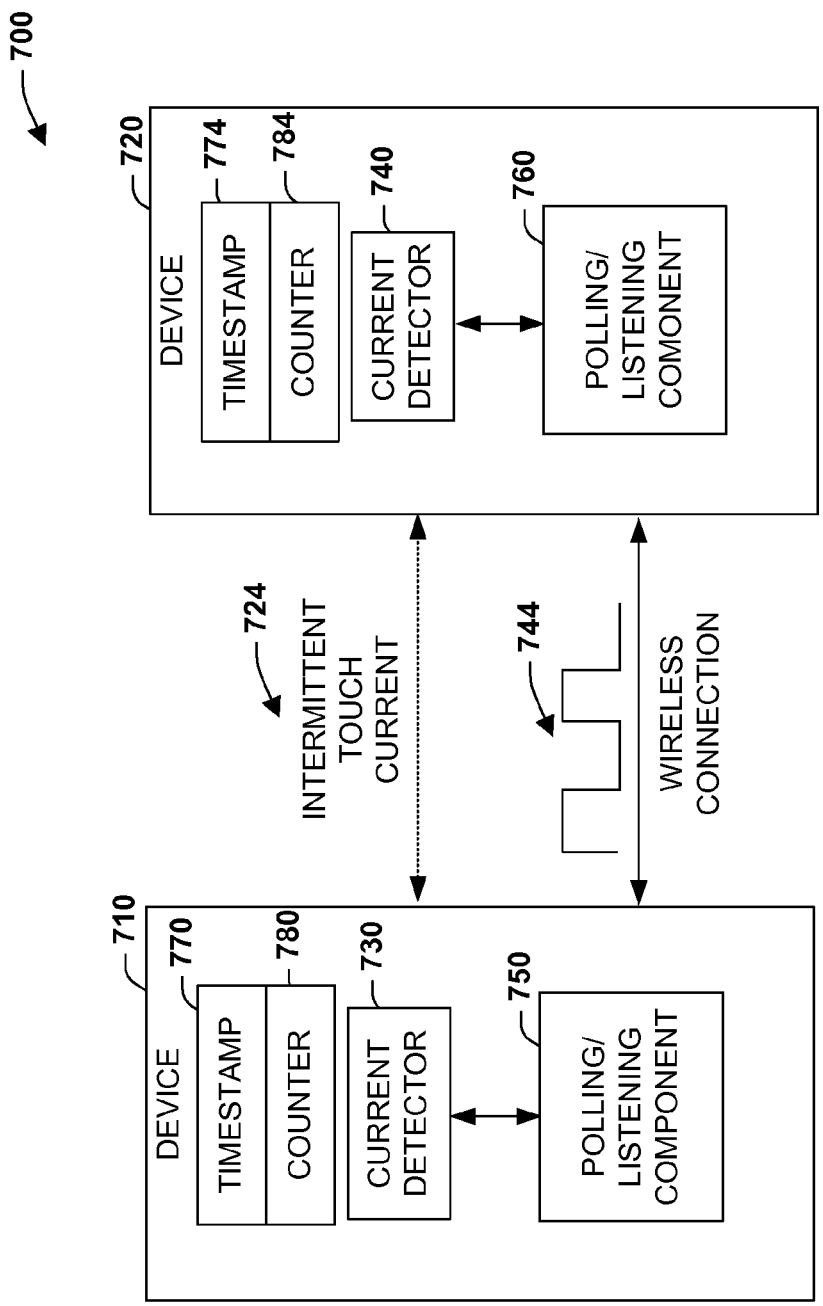
FIG. 7 is a schematic block diagram illustrating alternative communications procedures in accordance with an aspect of the present invention.

FIG. 7 is a system 700 illustrating alternative communications procedures in accordance with an aspect of the present invention. Similar to above, a device 710 and device 720 are touched as previously described, wherein an electrical current 724 flows between devices. In this aspect, the touch may only be momentary or intermittent and not allow a full configuration to occur through the body. When devices are capacitively coupled, a current or voltage source (not shown) can transmit current though the circuit completed by the user or users. As the current 724 flows, a current detector 730 and 740 measures the current as noted above with respect to FIG. 6. From the measured current, an electrical pulse 744 can be generated over a wireless connection from polling/listening components 750 and/or 760. The electrical pulse or pulses 744 is then employed to allow the devices 710 and/or 720 to identify themselves (e.g., poll for devices having identified code).

In this aspect of the present invention, when the devices 710 and 720 are touched, a timestamp 770 and 774 may be recorded. The timestamp can then be employed to uniquely identify devices (e.g., at moment touch current is detected, record time from a high speed clock). The timestamp data can then be encoded as part of the data packets 744 to allow the devices 710 and 720 communicate in accordance with the encoded stamp while discriminating these same communications from devices not having a similar timestamp. Alternatively, a high-speed counter 780 and 784 may begin counting when current begins to flow and stopped when current is no longer flowing. The counter data may also be encoded as data packets 744 during an identifying sequence. As noted above, after respective devices have identified themselves, other configuration or communications sequences can thereby follow.

Figure 8:
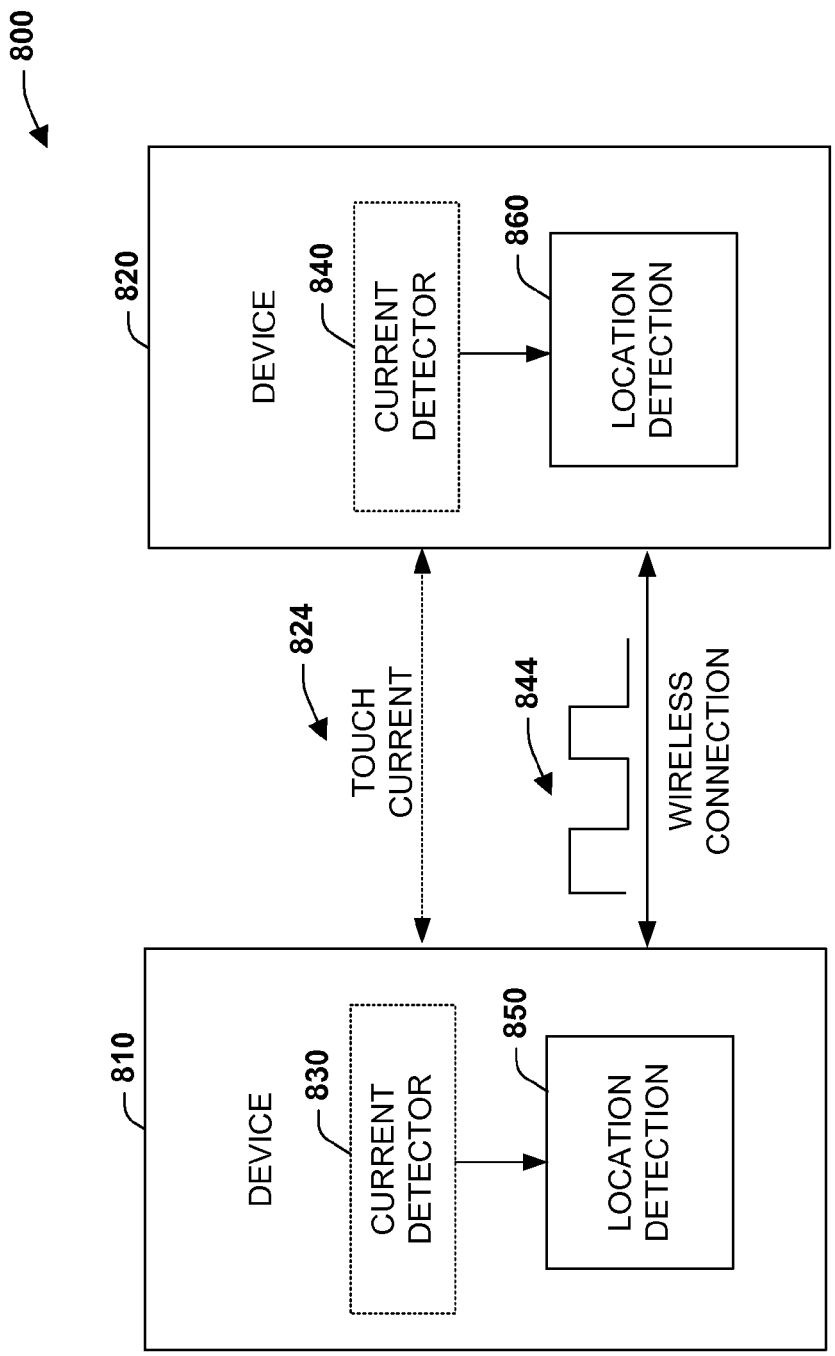
FIG. 8 is a diagram illustrating location detection in accordance with an aspect of the present invention.

FIG. 8 is a system 800 illustrating location detection in accordance with an aspect of the present invention. Similar to the system depicted in FIG. 7, the system 800 can employ one or more devices 810 and 820 generating a touch current 824 across a biological medium and sensed by current detectors 830 and 840. Also, data packets 844 can be generated across a wireless connection. In this aspect, location detection components 850 and 860 are employed to uniquely identify communicating devices. In one example, this can include employing the location components 850 and 860 to identify the location of the devices 810 and 820 and/or identify the location of the user or users. For example, if a suitable location technology were utilized for the location detection components 850 and 860, after a touch current 824 was detected, location information could be employed to facilitate wireless communications between all devices within a predetermined proximity of a fixed location (e.g., establish communications with all devices within 20 foot radius of the devices 850 and 860). In one example, a user may pull a PDA out of their pocket in the airport and based on the touch, it may automatically search out and try to establish connections (e.g., service discovery connections) with any devices within the range based on determined location coordinates.

In another aspect, user's locations can be identified via the location detection components 850 and 860. Thus, if a user were detected within proximity to a device, the user's presence in proximity to the device can be utilized to establish further communications (e.g., if user detected near devices within 2 seconds after concurrent touch of devices, then establish further communications with all devices within user's proximity). In addition to location detection technology, other techniques can be employed to determine device and/or user presence. This can include other sensors that may be employed by wireless devices such as accelerometers, piezoelectric devices, 802.11 signal strength sensors, infrared proximity sensors, microphones, cameras, and/or touch sensors, for example.

In order to determine user presence, the location detection components 850 and 860 can include one or more models for reasoning or inferring a user's desire to pair or bond devices. Such models can include substantially any type of system such as statistical/mathematical models and processes that include the use of Bayesian learning, which can generate Bayesian dependency models, such as Bayesian networks, naïve Bayesian classifiers, and/or Support Vector Machines (SVMs), for example. Other type models or systems can include neural networks and Hidden Markov Models, for example. Although elaborate reasoning models can be employed in accordance with the present invention, it is to be appreciated that other approaches can also utilized. For example, rather than a more thorough probabilistic approach, deterministic assumptions can also be employed (e.g., no cell phone activity for X amount of time may imply by rule that user is not near phone). Thus, in addition to reasoning under uncertainty, logical decisions can also be made regarding the status, location, context, focus, and so forth of users and/or associated devices.

Figure 9:
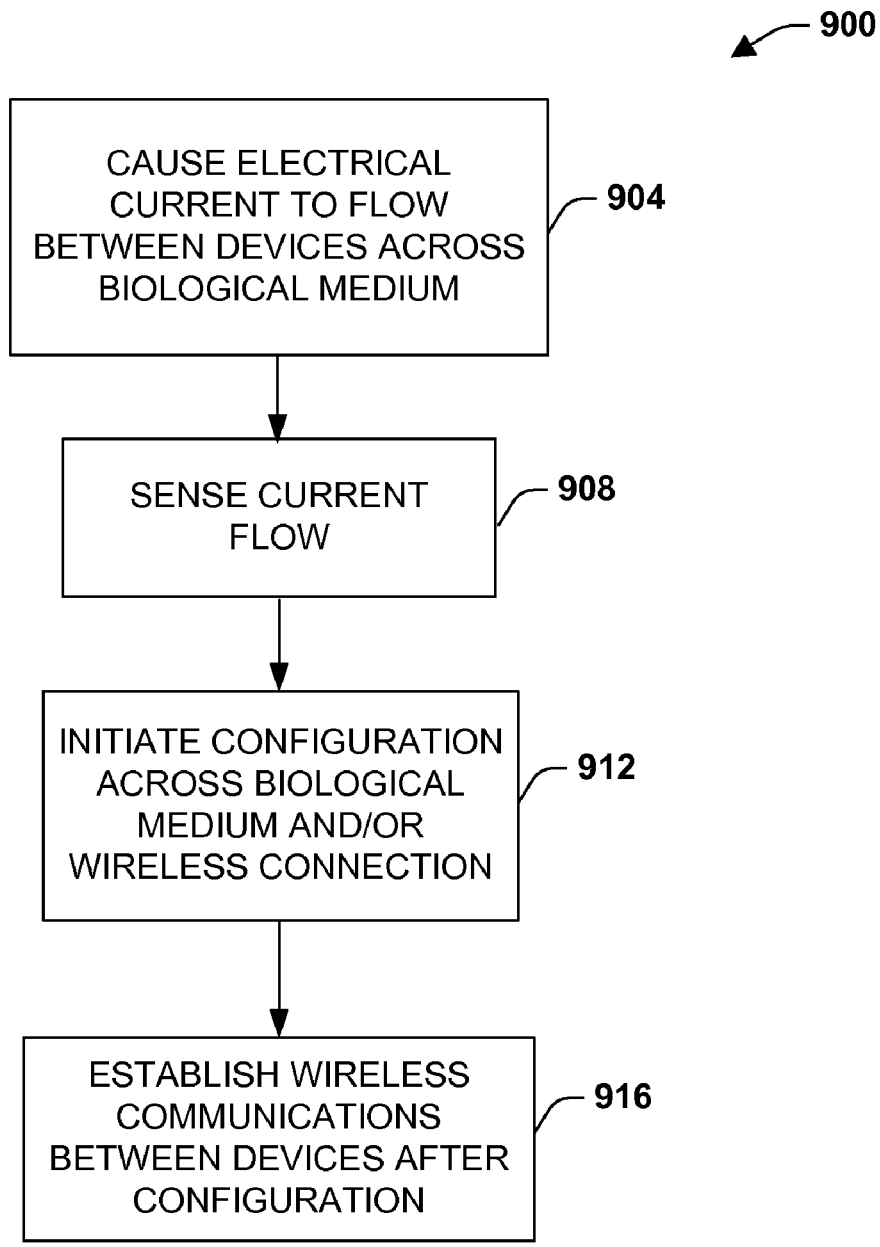
FIG. 9 is a flow diagram illustrating biological bonding and communications in accordance with an aspect of the present invention.

FIG. 9 illustrates a methodology for biological bonding and communications in accordance the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

FIG. 9 is a flow diagram 900 illustrating biological bonding and communications in accordance with an aspect of the present invention. Proceeding to 904, electrical current flows is caused to flow between one or more wireless devices via a biological medium such as the human hand or other body component. As noted above, biological bonding can include chaining of users and/or devices in order to cause the current to flow between respective devices and/or users. At 908, current flow is sensed by the biologically bonded devices. This can include current detectors, impedance detectors, or other devices capable of detecting when biological contact has occurred. Also, location detection can also occur to enable devices to identify themselves and discriminate from other communicating devices. At 912, a configuration is initiated across the biological bonding (e.g., across capacitive elements of body).

As noted above, configurations can occur through the body, across wireless connections after touching has occurred, and/or employing combinations of touch connections and wireless connections. At 916, wireless communications are established after device configurations have occurred. At this point, further communications can occur across the biological medium, across the wireless connection, and/or across both the medium and the connection. If desired, a re-initialization or other procedure can be initiated by touching respective devices for a predetermined interval or sequence (e.g., if configured devices sense re-touch for more than X seconds, reinitiate configuration, if devices sense three taps on touch pad, reinitiate configuration or other automated procedure).

Figure 10:
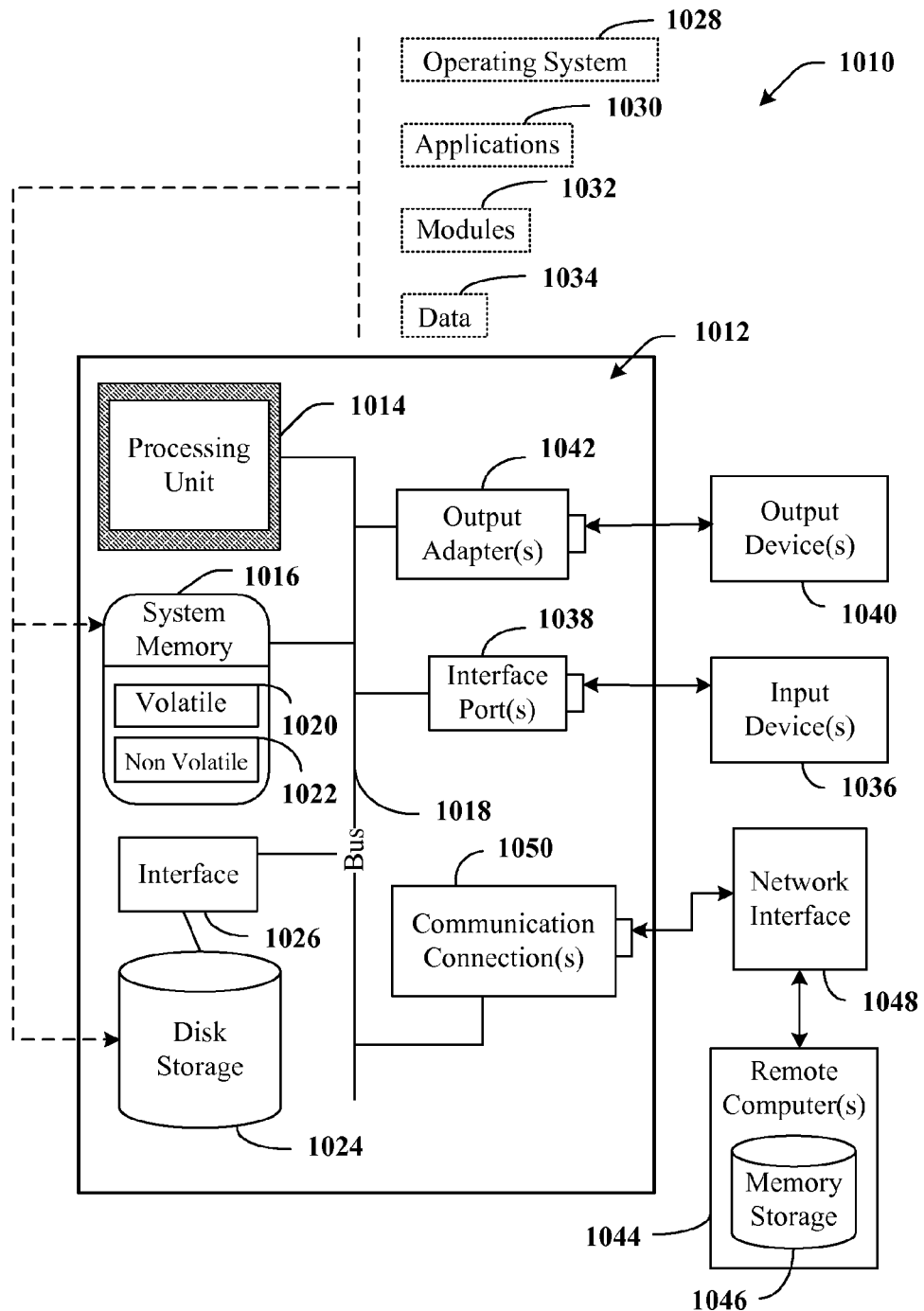
FIG. 10 is a schematic block diagram illustrating a suitable operating environment in accordance with an aspect of the present invention.

With reference to FIG. 10, an exemplary environment 1010 for implementing various aspects of the invention includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable ROM (EEPROM), or flash memory. Volatile memory 1020 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the present invention can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, that require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereof, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

Figure 11:
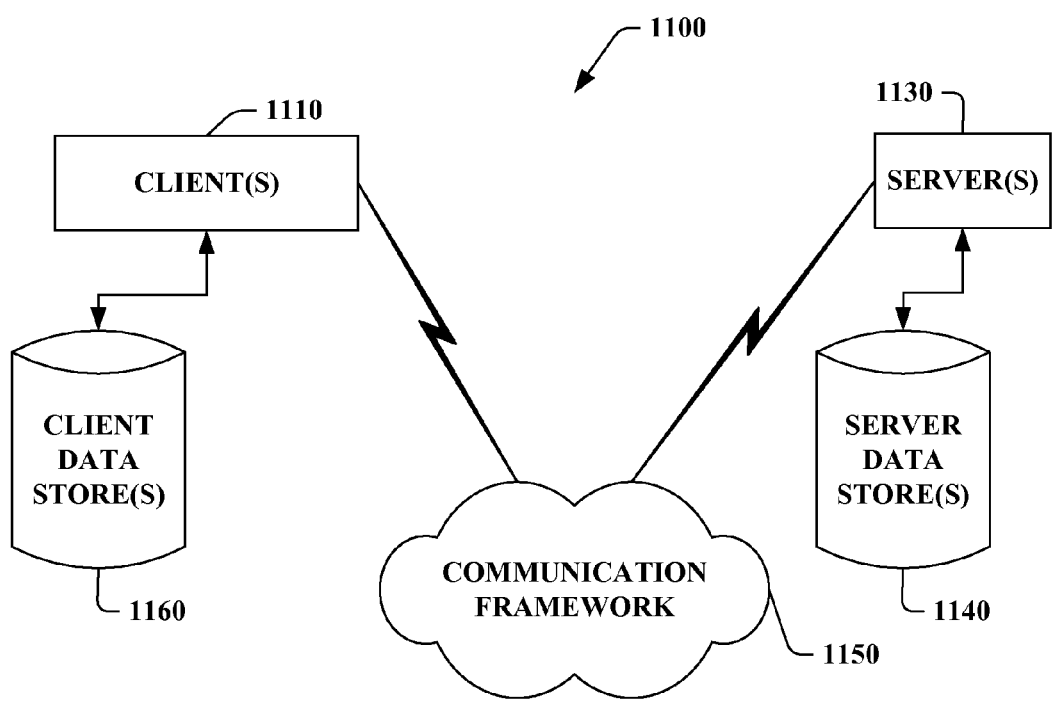
FIG. 11 is a schematic block diagram of a sample-computing environment with which the present invention can interact.

FIG. 11 is a schematic block diagram of a sample-computing environment 1100 with which the present invention can interact. The system 1100 includes one or more client(s) 1110. The client(s) 1110 can be hardware and/or software (e.g., threads, processes, computing devices). The system 1100 also includes one or more server(s) 1130. The server(s) 1130 can also be hardware and/or software (e.g., threads, processes, computing devices). The servers 1130 can house threads to perform transformations by employing the present invention, for example. One possible communication between a client 1110 and a server 1130 may be in the form of a data packet adapted to be transmitted between two or more computer processes. The system 1100 includes a communication framework 1150 that can be employed to facilitate communications between the client(s) 1110 and the server(s) 1130. The client(s) 1110 are operably connected to one or more client data store(s) 1160 that can be employed to store information local to the client(s) 1110. Similarly, the server(s) 1130 are operably connected to one or more server data store(s) 1140 that can be employed to store information local to the servers 1130.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of operating a first wireless device to facilitate communications with a second wireless device, the method comprising:
    sensing a property based on an electrical signal propagated between the first wireless device and the second wireless device through a user, the sensed property comprising at least one property selected from the group consisting of a time of the sensed electrical signal, a level of the sensed electrical signal, and a location of the first wireless device when the electrical signal is detected; and
    identifying the second wireless device based on the sensed property while establishing a connection with the second wireless device,
    wherein identifying the second wireless device comprises receiving, from the second device, data encoding a value proportional to the sensed property.

2. The method of claim 1, wherein the data includes one or more data packets and/or one or more pulses.

3. The method of claim 1, wherein sensing the property includes sensing one or more electrical properties of the user through direct or indirect physical touching.

4. The method of claim 3, wherein the indirect physical touching includes touching through a glove or other clothing of the user.

5. The method of claim 1, wherein:
sensing a property based on the electrical signal includes sensing an electrical signal propagated to a plurality of wireless devices through concurrent touching of a plurality of users, the plurality of wireless devices including the first wireless device, the second wireless device and at least one additional wireless device, and;
the method further comprises identifying the at least one additional wireless device based on the sensed property, and establishing a connection with the at least one additional wireless device.

6. The method of claim 1, further comprising:
generating a profile store to aggregate property keys relating to the sensed property; and
employing the property keys to execute at least one procedure selected from the group consisting of security procedures, pairing procedures, and providing device address information.

7. The method of claim 1, wherein sensing the property includes detecting a current flow from the user.

8. The method of claim 1, wherein the sensed property is an electrical property including at least one of a capacitance, an inductance, and a resistance associated with the user.

9. The method of claim 1, wherein the data received from the second wireless device is received over a wireless connection.

10. The method of claim 1, wherein the data received from the second wireless device is received over a connection through the user.

11. The method of claim 1, wherein the identifying comprises determining that the user touched the first wireless device and the second wireless device at similar times.

12. The method of claim 1, wherein the identifying comprises determining that the second wireless device is located within a predetermined range of the location of the first wireless device when the electrical signal is detected.

13. One or more computer-readable memory devices storing instructions that, when executed by a computing device, implement a method comprising:
sensing a property based on an electrical signal propagated between the first wireless device and the second wireless device through a user, the sensed property including at least one of a time of the sensed electrical signal, a level of the sensed electrical signal, or a location of the first wireless device when the electrical signal is detected;
identifying the second wireless device based on data received from the second wireless device, the data encoding a value proportional to the sensed property; and
establishing a connection with the second wireless device once identified.

14. The one or more computer-readable memory devices of claim 13, wherein the data received from the second wireless device is received over a wireless connection.

15. The one or more computer-readable memory devices of claim 13, wherein the data received from the second wireless device is received over a connection through the user.

16. The one or more computer-readable memory devices of claim 13, wherein the identifying includes determining that the user touched the first wireless device and the second wireless device at similar times.

17. The one or more computer-readable memory devices of claim 13, wherein the identifying includes determining that the second wireless device is located within a predetermined range of the location of the first wireless device when the electrical signal is detected.

18. The one or more computer-readable memory devices of claim 13, wherein sensing the property includes detecting current flow from the user.

19. The one or more computer-readable memory devices of claim 13, wherein sensing the property includes sensing an electrical property including at least one of a capacitance, an inductance, or a resistance associated with the user.

20. A wireless device comprising:
a biometrics module configured to sense a property based on an electrical signal received from another wireless device through a user, the sensed property including at least one of a time of the sensed electrical signal, a level of the sensed electrical signal, or a location of the wireless device when the electrical signal is detected;
a communication module configured to:
identify the other wireless device based on data received from the other wireless device, the data encoding a value proportional to the sensed property; and
establish a communicative coupling with the other wireless device once identified.

\* \* \* \* \*